W. O. LUM.
MOTOR CONTROL SYSTEM.
APPLICATION FILED APR. 12, 1915.
1,227,810. Patented May 29, 1917.
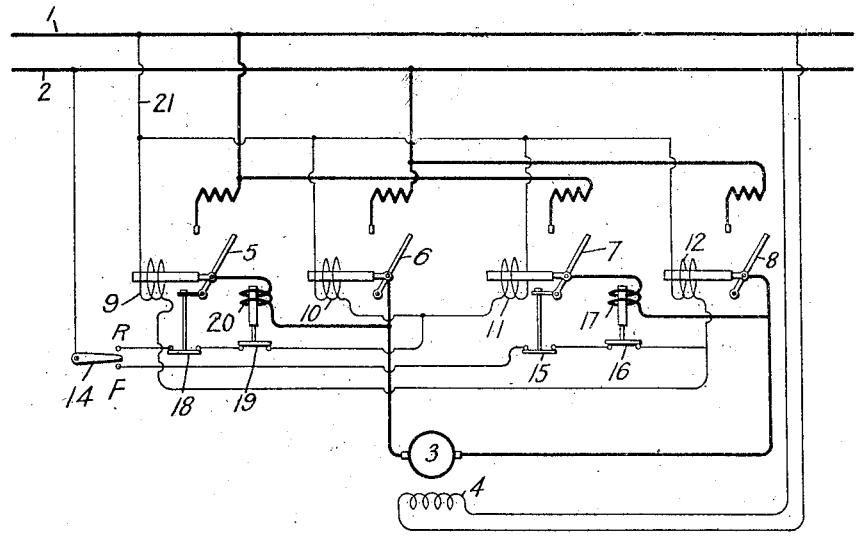
WITNESSES:
Fred H. Miller
J. R. Langley
INVENTOR
Walte. O. Lum
BY
Wesley G. Carr
ATTORNEY

UNITED STATES PATENT OFFICE.

WALTER O. LUM, OF WILKINSBURG, PENNSYLVANIA, ASSIGNOR TO WESTINGHOUSE ELECTRIC AND MANUFACTURING COMPANY, A CORPORATION OF PENNSYLVANIA.

MOTOR-CONTROL SYSTEM.

1,227,810.   Specification of Letters Patent.   Patented May 29, 1917.

Application filed April 12, 1915. Serial No. 20,681.

*To all whom it may concern:*

Be it known that I, WALTER O. LUM, a citizen of the United States, and a resident of Wilkinsburg, in the county of Allegheny and State of Pennsylvania, have invented a new and useful Improvement in Motor-Control Systems, of which the following is a specification.

My invention relates to motor control systems, and it has for its object to provide a simple and efficient means for preventing the reversal of an electric motor while the current traversing its circuit exceeds a predetermined value.

In the operation of electric motors that are supplied with current at relatively high voltages, in connection with machines where frequent reversals are necessary, it may occur that the switches for controlling the direction of rotation of the motors may be operated while the motor current has a considerable value. The opening of the motor circuit under such conditions tends to produce arcs at the switch contact members and the motor is apt to be reversed while the current traversing such arcs is sufficiently heavy to cause a short-circuit.

According to the present invention, I provide two pairs of electromagnetically actuated switches for controlling the direction of rotation of the motor. The switches are arranged to operate in pairs and the control circuit for each pair of switches is controlled by a switch that is mechanically interlocked with a switch of the other pair and by a series relay switch. By means of this arrangement, it is impossible to close both pairs of switches simultaneously or to close one pair of switches when the current traversing the motor circuit comprising the other pair of switches exceeds a predetermined value.

In the accompanying drawing, the single figure is a diagrammatic view of circuits and apparatus embodying my invention.

Line conductors 1 and 2, which may be connected to any suitable source of direct current, supply energy to an electric motor, the armature of which is indicated at 3 and which has a shunt field winding 4. The armature circuit of the motor is controlled by electromagnetically operated switches 5, 6, 7 and 8 that are respectively provided with actuating coils 9, 10, 11 and 12. The coils 9 and 12 are arranged in parallel-circuit relation and the coils 10 and 11 are similarly arranged.

The circuits of the respective pairs of coils are controlled by a master switch 14. The circuit of the coils 9 and 12 is controlled, also, by a switch 15 that is mechanically interlocked with the switch 7 and a relay switch 16 having an actuating coil 17 in series with the switch 7. The circuit of the coils 10 and 11 is similarly controlled by a switch 18 that is mechanically interlocked with the switch 5 and a relay switch 19 having an actuating coil 20 in series with the switch 5.

It may be assumed that it is desired to operate the motor and that the switch 14 is actuated, for example, downwardly, to close a circuit extending from the line conductor 1 through a conductor 21, coils 9 and 12 in parallel, relay switch 16, switch 15 and switch 14 to line conductor 2. The coils 9 and 12 are thereby energized to close the corresponding switches 5 and 8. Current then flows through the armature circuit of the motor which extends from the line conductor 1, through switch 5, coil 20, armature winding 3 and switch 8 to the line conductor 2.

The motor then operates, in what may be termed, by way of example, the forward direction. The closing of the switch 5 operates to open the switch 18 which is in circuit with the coils 10 and 11 of the switches 6 and 7. The relay switch 19 will also open and remain in that position as long as the current traversing the motor circuit exceeds a predetermined value. This value is arranged sufficiently low to insure that no damage may be caused by the reversal of the motor.

To reverse the motor, the switch 14 is actuated upwardly to break the circuit of the coils 9 and 12 and to establish a similar circuit for the coils 10 and 11. Current then flows from the line conductor 1 through conductor 21, coils 10 and 11, in parallel, relay switch 19, switches 18 and 14 to line conductor 2. The coils 10 and 11 are thus energized to close the switches 6 and 7 and thereby reverse the connection of the armature winding 3. The motor then operates in the reverse direction, the connections of the shunt field winding 4 remaining unchanged. The closing of the switch 7 operates to open the switch 15 which is mechanically connected to it, and the relay switch 16 opens when the current traversing the motor circuit exceeds a predetermined value corresponding to that for which the switch 19 is adjusted.

In case the opening of switches 5 and 8 to reverse the motor produces arcs which carry current above the predetermined value at which the coil 20 is designed to permit the closing of switch 19, the latter remains in its open position. The coils 10 and 11 are not energized until the current traversing the switches 5 and 8 falls to the predetermined safe value at which the switch 19 closes to complete a circuit for the coils 10 and 11. The switch 16 and coil 17 operate in the same manner to prevent the closing of switches 5 and 8 when the current traversing switches 6 and 7 is of such value that short-circuit conditions may be produced by the premature closing of switches 5 and 8.

It will be noted that I provide a simple means for effectually preventing the simultaneous actuation of controlling switches for producing rotation of the motor in opposite directions. The closing of one set of switches operates to break the controlling circuit of the other pair of switches so that the latter cannot be actuated until the former have opened. I provide also means actuated in accordance with the current traversing the motor circuit for preventing the actuation of one pair of reversing switches while the other pair is in circuit.

I claim as my invention:

1. In a motor control system, the combination with an electric motor, and a plurality of pairs of electromagnetic switches for controlling the direction of rotation of said motor, of means for preventing the closure of one pair of said switches when current of a predetermined value traverses the other pair of said switches, said means comprising relays having actuating coils in series with said switches and the armature of said motor, and means for preventing the simultaneous actuation of two pairs of said switches.

2. In a motor control system, the combination with an electric motor and a plurality of pairs of electromagnetic switches for controlling the direction of rotation of said motor, of means for preventing the simultaneous actuation of two pairs of said switches, said means comprising relays mechanically connected to certain of said switches and means for preventing the closure of one pair of switches when the current traversing the other pair of switches exceeds a predetermined value.

3. In a motor control system, the combination with an electric motor and a plurality of pairs of electromagnetic reversing switches therefor, of means for preventing the closure of one pair of said switches when the other pair of switches are in their open position and are traversed by current above a predetermined value, and relays mechanically connected to certain of said switches for controlling the actuating coils of said switches.

4. In a motor control system, the combination with an electric motor and a plurality of pairs of electromagnetic reversing switches therefor, of means for preventing the closure of one pair of said switches when arcs occurring at the other pair of switches conduct current above a predetermined value, said means comprising relays having actuating coils in series with said switches and with the armature of said motor, and relays mechanically connected to certain of said switches and in series circuit relation with the other relays for controlling the circuit of the actuating coils of said switches.

In testimony whereof, I have hereunto subscribed my name this 30th day of March, 1915.

WALTER O. LUM.